United States Patent
Luo et al.

(10) Patent No.: US 11,119,915 B2
(45) Date of Patent: Sep. 14, 2021

(54) DYNAMIC MEMORY MAPPING FOR NEURAL NETWORKS

(71) Applicant: Samsung Electronics, Co. Ltd., Suwon-shi (KR)

(72) Inventors: Chenchi Luo, Plano, TX (US); Hyejung Kim, Murphy, TX (US); Seok-Jun Lee, Allen, TX (US); David Liu, Plano, TX (US); Michael Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/892,195

(22) Filed: Feb. 8, 2018

(65) Prior Publication Data

US 2019/0243755 A1    Aug. 8, 2019

(51) Int. Cl.
| | |
|---|---|
| *G06F 12/06* | (2006.01) |
| *G06N 3/063* | (2006.01) |
| *G06N 3/04* | (2006.01) |
| *G06N 3/08* | (2006.01) |

(52) U.S. Cl.
CPC .......... *G06F 12/0638* (2013.01); *G06N 3/04* (2013.01); *G06N 3/063* (2013.01); *G06N 3/08* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 4,511,964 A | 4/1985 | Georg et al. | |
| 6,332,178 B1 | 12/2001 | Dean et al. | |
| 7,020,753 B2 | 3/2006 | Shanahan et al. | |
| 7,401,201 B2 | 7/2008 | Moyer et al. | |
| 7,734,890 B2 | 6/2010 | Morris | |
| 8,135,936 B2 | 3/2012 | Schaefer et al. | |
| 9,009,383 B2 | 4/2015 | Hendry et al. | |
| 9,026,767 B2 | 5/2015 | Schaefer et al. | |
| 9,373,059 B1 | 6/2016 | Heifets et al. | |
| 9,406,017 B2 | 8/2016 | Hinton et al. | |
| 9,524,450 B2 | 12/2016 | Ravindran et al. | |
| 9,530,071 B2 | 12/2016 | Yin et al. | |

(Continued)

FOREIGN PATENT DOCUMENTS

| | | |
|---|---|---|
| WO | 92/18946 A1 | 10/1992 |
| WO | 01/18653 A1 | 3/2001 |
| WO | 2016/141282 A1 | 9/2016 |

OTHER PUBLICATIONS

Cavigelli, et al., "CBinfer: Change-Based Inference for Convolutional Neural Networks on Video Data", arXiv preprint, arXiv:1704.04313v1 [cs.CV] Apr. 14, 2017. (8 pages).

(Continued)

*Primary Examiner* — Charles Rones
*Assistant Examiner* — Jonah C Krieger

(57) ABSTRACT

A method to map a plurality of feature maps of a neural network onto a memory hierarchy includes mapping a first feature map of the plurality of feature maps to a memory in a memory hierarchy having available memory space and providing quickest access to the first feature map. The method also includes, when the first feature map expires, removing the first feature map from the memory used to store the first feature map.

25 Claims, 11 Drawing Sheets

(56) References Cited

U.S. PATENT DOCUMENTS

| | | |
|---|---|---|
| 9,542,408 B2 | 1/2017 | Moss et al. |
| 9,563,825 B2 | 2/2017 | Shen et al. |
| 9,563,840 B2 | 2/2017 | Krizhevsky et al. |
| 9,589,210 B1 | 3/2017 | Estrada et al. |
| 9,665,802 B2 | 3/2017 | Wang et al. |
| 9,619,735 B1 | 4/2017 | Lineback et al. |
| 2002/0194540 A1 | 12/2002 | Cheung et al. |
| 2005/0246502 A1 | 11/2005 | Joshi et al. |
| 2012/0041914 A1 | 2/2012 | Tirunagari |
| 2013/0246734 A1 | 9/2013 | Schaefer et al. |
| 2015/0036920 A1 | 2/2015 | Wu et al. |
| 2016/0054933 A1* | 2/2016 | Haghighi ............. G06F 3/0658 711/103 |
| 2016/0140424 A1 | 5/2016 | Wang et al. |
| 2016/0163014 A1 | 6/2016 | Yang et al. |
| 2016/0171346 A1 | 6/2016 | Han et al. |
| 2016/0239706 A1 | 8/2016 | Dijkman et al. |
| 2016/0300121 A1 | 10/2016 | Chertok et al. |
| 2016/0350645 A1* | 12/2016 | Brothers ............. G06N 3/0454 |
| 2017/0083792 A1 | 3/2017 | Rodriguez-Serrano et al. |
| 2017/0104713 A1 | 4/2017 | Agarwal et al. |
| 2017/0140253 A1 | 5/2017 | Wshah et al. |
| 2017/0357894 A1 | 12/2017 | Bainville et al. |
| 2019/0065880 A1* | 2/2019 | Loginov ............... G06K 9/6274 |
| 2020/0085290 A1* | 3/2020 | Wang ....................... G06N 3/08 |

OTHER PUBLICATIONS

Chen, et al., "Training Deep Nets with Sublinear Memory Cost", arXiv:1604.06174v2 [cs.LG] Apr. 22, 2016. (12 pages).

Saidane, et al., "Automatic Scene Text Recognition using a Convolutional Neural Network", Orange Labs, 2017, pp. 100-106. (7 pages).

Su, et al., "Improving the Self-Organizing Feature Map Algorithm Using an Efficient Initialization Scheme", Tamkang Journal of Science and Engineering, vol. 5, No. 1, pp. 35-48 (2002). (14 pages).

Sun, et al., "Design of Kernels in Convolutional Neural Networks for Image Classification", arXiv:1511.09231v3 [cs.CV] Nov. 29, 2016. (20 pages).

ISA/KR, "International Search Report and Written Opinion of the International Searching Authority," International Application No. PCT/KR2018/003985, dated Oct. 23, 2018, 14 pages.

Supplementary European Search Report dated Dec. 16, 2020 in connection with counterpart European Patent Application No. 18905171.7, 11 pages.

Wikipedia, "Cache replacement policies," Jan. 16, 2018, 9 pages.

* cited by examiner

DYNAMIC MEMORY MAPPING FOR NEURAL NETWORKS

TECHNICAL FIELD

This disclosure relates generally to neural networks. More specifically, this disclosure relates to dynamic memory mapping and layer fusion for neural networks.

BACKGROUND

Deep learning or Deep Neural Networks is a revolutionary force in artificial intelligence. Computers use Deep learning to make sense of infinite amounts of data in the form of images, sound, and text. Using multiple layers of neural perceptrons, computers now have the capacity to see, learn, and react to complex situations as well as if not better than humans.

Modern deep convolutional neural networks are very deep in design and can include 10s to 100s of layers. Existing deep learning framework statically map all the feature maps onto the DRAM, which implies that the memory usage grows proportionally with the depth of the network. On the other hand, each layer has to read its input feature map from DRAM to on-chip memory and write back its output feature map to DRAM thereby requiring multiple reads and writes between on-chip memory and DRAM which is both time and energy consuming.

SUMMARY

This disclosure provides dynamic memory mapping for neural networks.

In a first embodiment, a method to map a plurality of feature maps of a neural network onto a memory hierarchy is provided. The method includes mapping a first feature map of the plurality of feature maps to a memory in a memory hierarchy having available memory space and providing quickest access to the first feature map. The method also includes, when the first feature map expires, removing the first feature map of the plurality of feature maps from the memory used to store the first feature map.

In a second embodiment, an electronic device is provided. The electronic device includes at least one memory in a memory hierarchy. The electronic device also includes at least one processor coupled to the at least one memory. The at least one processor is configured to map a first feature map of a plurality of feature maps to a memory in the memory hierarchy having available memory space and providing quickest access to the first feature map. The at least one processor is also configured to, when the first feature map expires, remove the first feature map from the memory, and unallocate the memory used to store the first feature map.

In a third embodiment, a non-transitory computer readable medium embodying a computer program is provided. The computer program includes computer readable program code that, when executed by at least one processor, causes the at least one processor to map a first feature map of a plurality of feature maps to a memory in a memory hierarchy, and, when the first feature map expires, remove the first feature map from the memory, and unallocate the memory used to store the first feature map.

In a fourth embodiment, an electronic device is provided. The electronic device includes a memory including on-chip memory and off-chip memory. The electronic device also includes at least one processor coupled to the memory. The at least one processor is configured to write data from a neural network input to on-chip memory. The at least one processor is also configured to provide the data to a fused layer of a neural network, wherein the fused layer includes two or more layers that are fused to reduce data movement between the on-chip memory and the off-chip memory, and perform a fused layer operation on the data. The at least one processor is also configured to generate an output from the fused layer operation, and write the output to off-chip memory.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
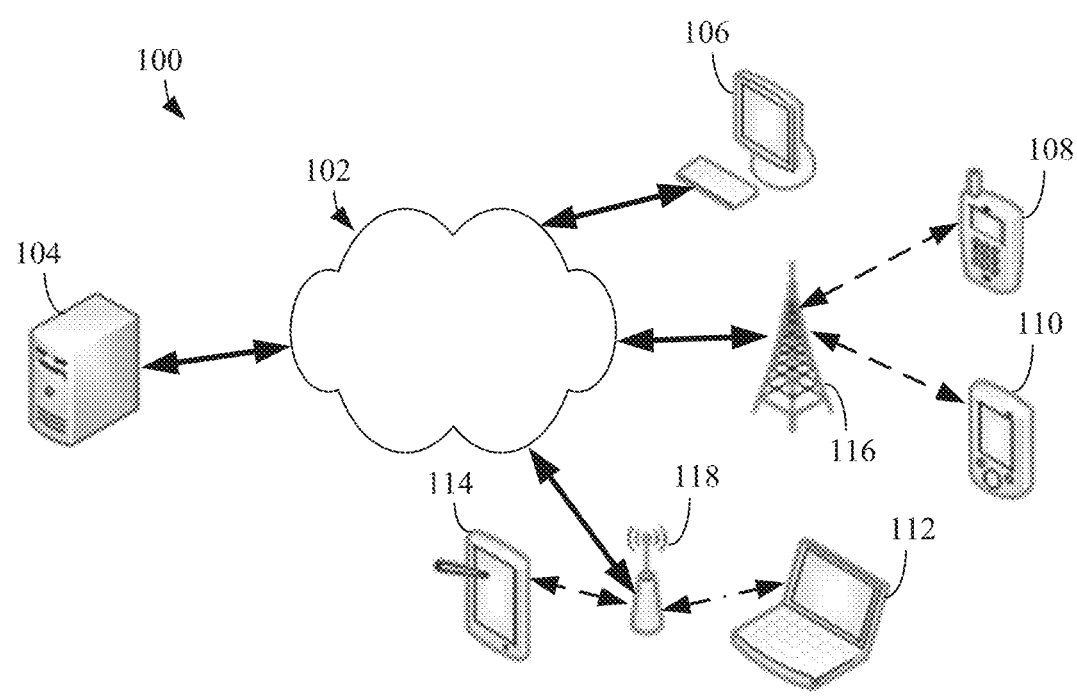
FIG. 1 illustrates an example communication system in accordance with embodiments of the present disclosure.

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

According to embodiments of the present disclosure, various methods for improving neural networks are provided. Deep neural networks can perform various functions such as image recognition, data analysis, natural language processing, intent classification, or other functions. Neural networks can generate an output based on a weighted sum of inputs, which is then passed through an activation function. The activation function is able to determine an output after summing the inputs multiplied by the weights. It will be understood by those skilled in the art that various activation functions can be used depending on the configuration of the neural network and the result to be achieved by the neural network.

The inputs, weights, and outputs can be organized within a multilayer perceptron (MLP), wherein there is an input layer, one or more hidden layers, and an output layer. A plurality of inputs, or an input vector, make up the input layer, a plurality of hidden layer neurons reside in the hidden layer or layers, and one or more outputs can be generated for the output layer. The neural network can be a feedforward network where inputs are passed from the input layer to a hidden layer. The inputs can be processed through an activation or transfer function to provide new inputs to a next hidden layer, if the neural network has multiple hidden layers, from hidden layer to hidden layer until the final hidden layer passes the final outputs to the output layer. As a neural network is trained, the weights can be adjusted based on calculated error rates to increase the accuracy of the neural network.

Convolutional neural networks can be used for image or object recognition. A convolution layer performs convolutions between an image and a kernel (a small matrix of values) to weight sections of the image based on the kernel. Convolutions can be performed on a subset of the image at a time until the full image is weighted by a kernel. Kernels using different weights can be used for additional convolutions, creating a feature map as a result of each convolution. Each feature map can then be passed to the next layer of the neural network. The next layer of a convolutional neural network can be a batch normalization layer, or Bnorm layer. The Bnorm layer can be used to normalize the activation of each convolution layer.

A convolutional neural network can also include a rectified linear units, or ReLU, layer. The ReLU layer applies an activation function to increase the nonlinear properties of the network, such as by zeroing out negative values. A convolutional neural network can also include a pooling layer, which can partition the input image into rectangles or sub-regions. Max pooling is a common method of pooling that outputs the maximum value of the sub-region. A convolutional neural network can perform any number of convolutions, batch normalizations, ReLU calculations, and pooling operations depending on the neural network. The image can be reduced down to a vector of values and a fully connected layer then takes the vector and provides one or more outputs, such as indicating whether the image matches a particular feature or object attempting to be detected. It will be appreciated that the present disclosure is not limited to any particular type of neural network and that this disclosure can be applied to any neural network to optimize the neural network.

A neural network based application, such as an object or image classification neural network running on a specific hardware, has multiple requirements, such as accuracy, execution speed, power consumption, and the like. Designing a network that meets all the requirements on a given target hardware can be challenging. A way of approaching this problem is to design a neural network having an accuracy that meets the application's requirements, and then simplifying the neural network while running the neural network on the hardware until the speed and power consumption requirements are met. However, this approach does not take into account the target hardware characteristics when designing or when simplifying the neural network.

Certain embodiments of the present disclosure provide dynamically mapping data used in a neural network onto a memory hierarchy of a device based on network topology to save memory usage for network inference and eliminate unnecessary data exchange between on-chip and off-chip memory. Certain embodiments of the present disclosure also provide a systematic optimization that fuses multiple layers into an atomic layer to avoid unnecessary data movement between on-chip and off-chip memory and to avoid memory usage from intermediate data between layers. Fusing the multiple layers into one atomic layer allows for processing the one atomic layer in on-chip memory rather than treating each layer individually and reading and writing data for each layer between on-chip and off-chip memory. Layer fusion eliminates intermediate data memory usage and reduces memory access time and power consumption.

FIG. 1 illustrates an example system 100 according to embodiments of this disclosure. The embodiment of the system 100 shown in FIG. 1 is for illustration only. Other embodiments of the system 100 could be used without departing from the scope of this disclosure.

The system 100 includes a network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Mobile devices 108 include both smart phones and feature phones. Smart phones represent a class of mobile devices 108 that are a handheld device with a mobile operating system and an integrated mobile broadband cellular network connection for voice, short message service (SMS), and internet data communication. Feature phones represent a class of mobile devices 108 that are a midway point between a basic phone and a smart phone. Feature phones generally have voice calling and text messaging functions in addition to basic multimedia and internet capabilities. Also, the client devices 112 and 114 (laptop computer and tablet computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) can transmit information securely and efficiently to another device, such as, for example, the server 104. The mobile device 108 (or any other client device 106-114) can receive information to be processed as an input(s) into a neural network. Such information can include image data, voice/audio data, geolocation data, user information, or other data received by or stored on the mobile device 108. The mobile device 108 (or any other client device 106-114) can trigger the information transmission between itself and server 104. The mobile device 108 (or any other client device 106-114) can provide a real-time result generated by a neural network.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide a result processed by a neural network. In certain embodiments, a client device (client device 106-114) can determine the neural network result. In certain embodiments, a client device (client device 106-114) receives the data to be included as inputs into a neural network and transmits the data over the network 102 to the server 104, which determines the output(s) using the neural network.

Figure 2:
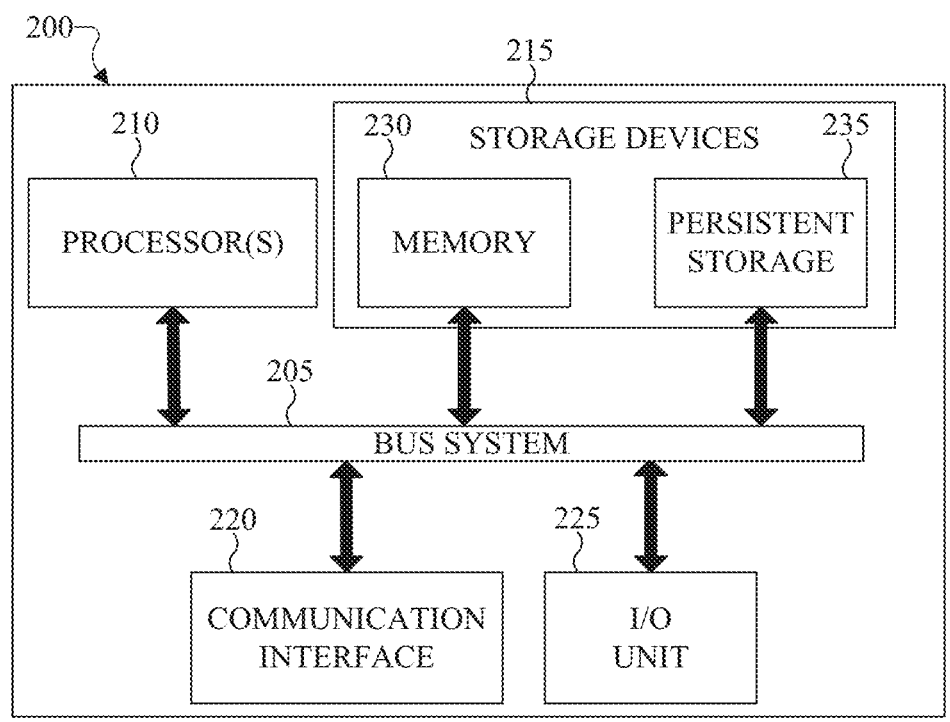
FIG. 2 illustrates an example electronic device server in accordance with embodiments of the present disclosure.
Figure 3:
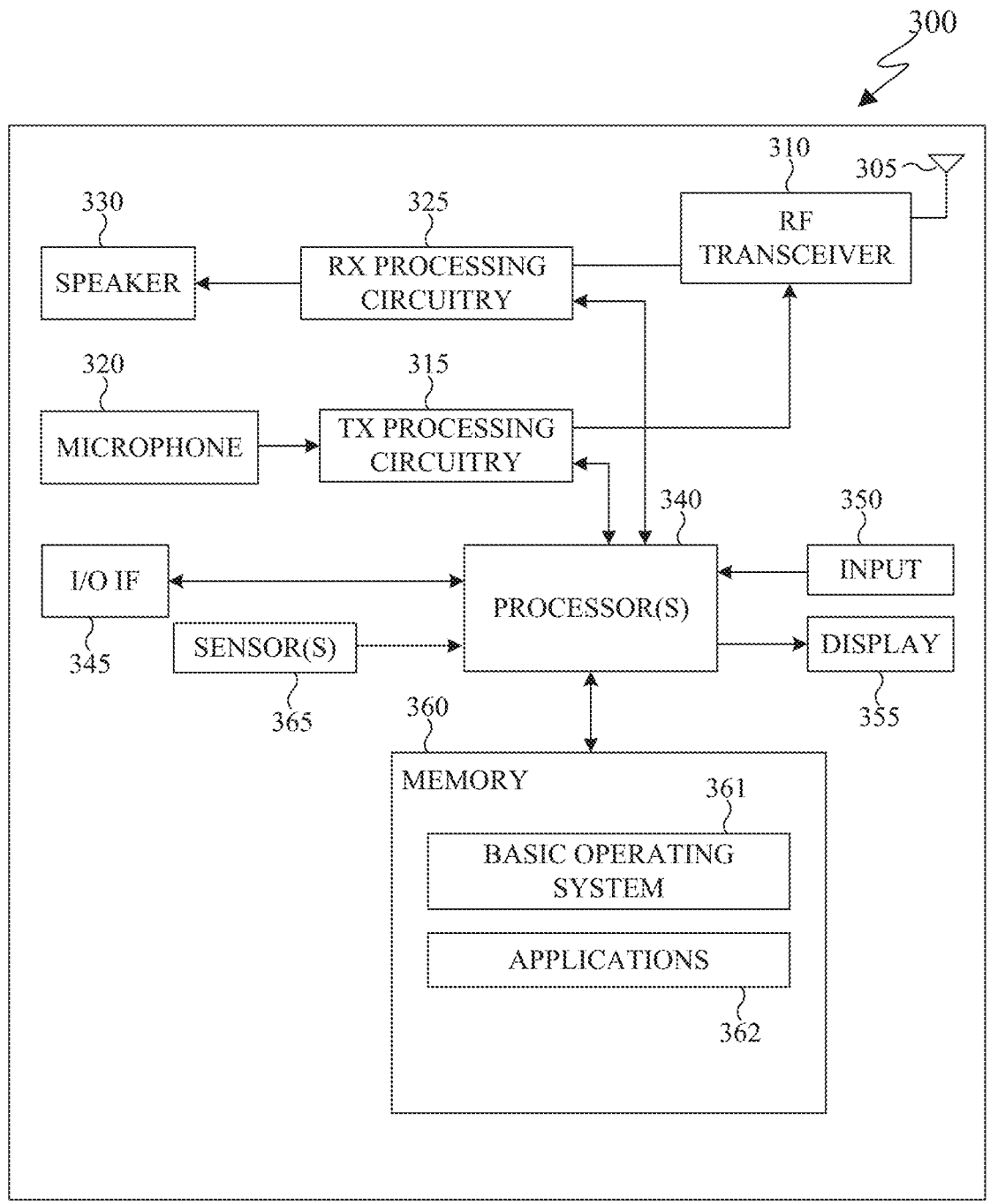
FIG. 3 illustrates an example electronic device in accordance with embodiments of the present disclosure.

FIGS. 2 and 3 illustrate example devices in a computing system in accordance with embodiments of the present disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

Server 200 can represent one or more local servers or one or more neural network servers for processing received inputs through a trained neural network. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, neural network inputs and other data, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications, such as providing neural network inputs or activating a function based on a neural network result or output. For example, the electronic device 300 can receive information, such as voice data, transfer the data to the server 200, receive a response from the server 200 indicating the result of processing the information through a neural network, and activate a function on the electronic device 300 in accordance with the result. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361, applications 362, and user data 363.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) 365 and/or a camera by providing additional input to processor 340. The camera can be used to capture images to be processed by a convolutional neural network. Such a convolutional neural network can be an application stored on the electronic device 300, or on the server 200, in which case the electronic device 300 can transmit a captured image to the server 200 to be processed by the neural network.

In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 that includes profile data and user history data. User data 363 can also contain data received from sensor 365. User data 363 can biographical and biometric data.

Electronic device 300 further includes one or more sensor(s) 365 that can meter a physical quantity or detect an activation state of the electronic device 300 and convert metered or detected information into an electrical signal. In certain embodiments, sensor 365 includes inertial sensors (such as accelerometers, gyroscopes, and magnetometers), optical sensors, motion sensors, cameras, pressure sensors, heart rate sensors, altimeter, breath sensors (such as microphone 320), and the like. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300 or another electronic device in communication with the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
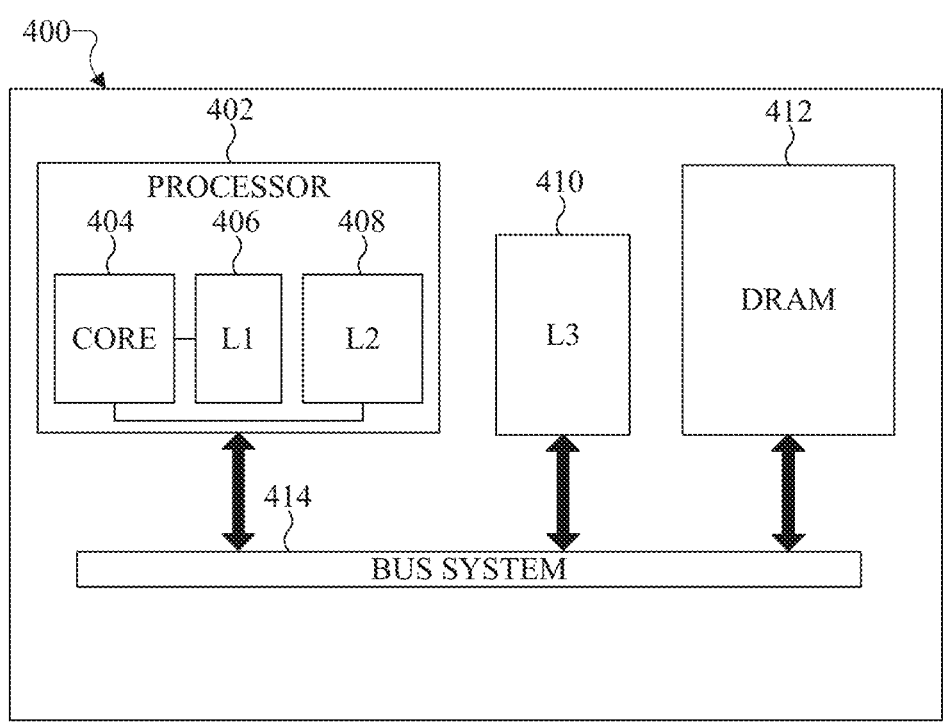
FIG. 4 illustrates another example electronic device in accordance with embodiments of the present disclosure.

FIG. 4 illustrates an example electronic device 400 in accordance with embodiments of the present disclosure. The embodiment of the electronic device 400 shown in FIG. 4 is for illustration only and other embodiments could be used without departing from the scope of this disclosure. The electronic device 400 can come in a wide variety of configurations, and FIG. 4 does not limit the scope of this disclosure to any particular implementation of an electronic device. In certain embodiments, the server 200 or the electronic device 300 can include the components or configuration of electronic device 400.

The electronic device 400 includes a processor 402. The processor 402 as illustrated includes a core 404, a level-1 (L1) memory cache 406, and a level-2 (L2) memory cache 408. It will be understood that there can be both an L1 memory cache for instructions and one for data. In some embodiments, the processor 402 includes multiple cores, and the L1 memory cache 406 is a dedicated memory cache for the core 404, while the L2 memory cache 408 is shared with one or more other cores of the processor 402. In such embodiments, each core accesses a dedicated L1 memory cache while sharing the L2 memory cache 408 with the other cores. In certain embodiments, each core has a dedicated L2 memory cache 408. The electronic device 400 also includes a level-3 (L3) memory cache 410 and dynamic random-access memory (DRAM) 412, located off the processor chip. The L3 memory cache 410 and the DRAM 412 are interconnected with each other and to the processor 402 by a bus system 414. In embodiments in which the processor 402 includes multiple cores, the L3 memory cache 410 can be shared by the cores.

The L1 memory cache 406, the L2 memory cache 408, the L3 memory cache 410, and the DRAM 412 form a memory hierarchy. Generally, a memory closer to the core 404 of the processor 402 is faster, but includes a smaller amount of maximum available memory. For example, the L1 memory cache 406 can provide the fastest data retrieval time for the core 404 when retrieving data stored on the L1 memory cache 406. Storing data that is anticipated as being used quickly and/or frequently can be stored in the L1 memory cache 406 to allow the core 404 fast access to the data. However, the L1 memory cache 406 may not have as much space as the other memory caches 408 and 410 or the DRAM 412.

Thus, when data needs to be accessed quickly or frequently by the core 404, but the data cannot fit into the L1 memory cache 406, the data can be saved in either the L2 memory cache 408, L3 memory cache 410, or the DRAM 412 based on the hierarchy. For example, if the data cannot fit into the L1 memory cache 406, a determination is made as to whether the data will fit into the L2 memory cache 408. If so, the data is stored in the L2 memory cache. If not, the available space of the L3 memory cache 410 is checked to determine if the data can be stored in the L3 memory cache 410. If so, the data is stored in the L3 memory cache 410. If not, the data can be stored in DRAM 412. Such a procedure ensures that the data used by the core 404 is stored in the fastest memory available.

For neural networks, data is often stored in DRAM, and then written to on-chip memory when the data is used by the processor. While the neural network is processing all inputs and generating the final output, the original data can stay in DRAM during the entire process, and new data created by the neural network can be written to DRAM while the neural network continues to operate. For example, after each hidden layer of the network creates new data to be used in the next layer, this new data can be written to DRAM, which also can still be storing the original inputs and other data previously created by the neural network. This new data can then be read from DRAM and written to on-chip memory for use by the next layer. For deep neural networks that include a large number of layers, this can create memory usage issues, as each layer can produce more data to be stored. This can also create issues with neural network performance, as every read/write between on-chip and off-chip memory decreases the speed of the neural network and increases power consumption.

Although FIG. 4 illustrates one example of an electronic device 400, various changes can be made to FIG. 4. For example, the electronic device 400 could include any number of each component in any suitable arrangement. For instance, the memory caches 408 and 410 can be either on-chip or off-chip. There can also be any number of memory caches disposed either on-chip or off-chip and that can be either dedicated to a core of the processor or shared among other processors. For example, the electronic device 400 could include the L3 memory cache 410 on-chip, and can also include another L4 memory cache off-chip. In general, computing systems, processors, and processor memory come in a wide variety of configurations, and FIG. 4 does not limit the scope of this disclosure to any particular configuration. While FIG. 4 illustrates one operational environment in which various features disclosed in this patent document can be used, these features could be used in any other suitable system.

Figure 5:
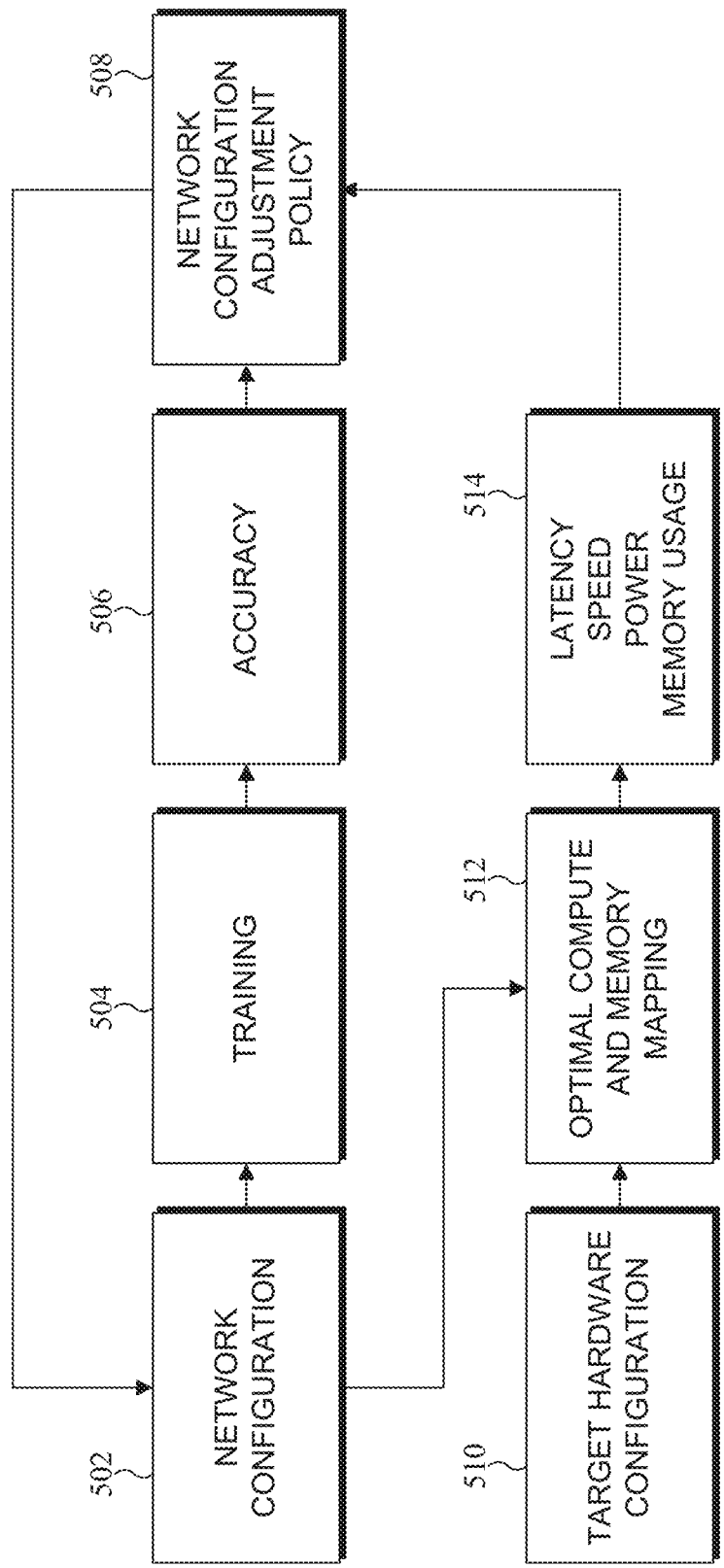
FIG. 5 illustrates a flowchart of a neural network optimization framework in accordance with embodiments of the present disclosure.
Figure 6:
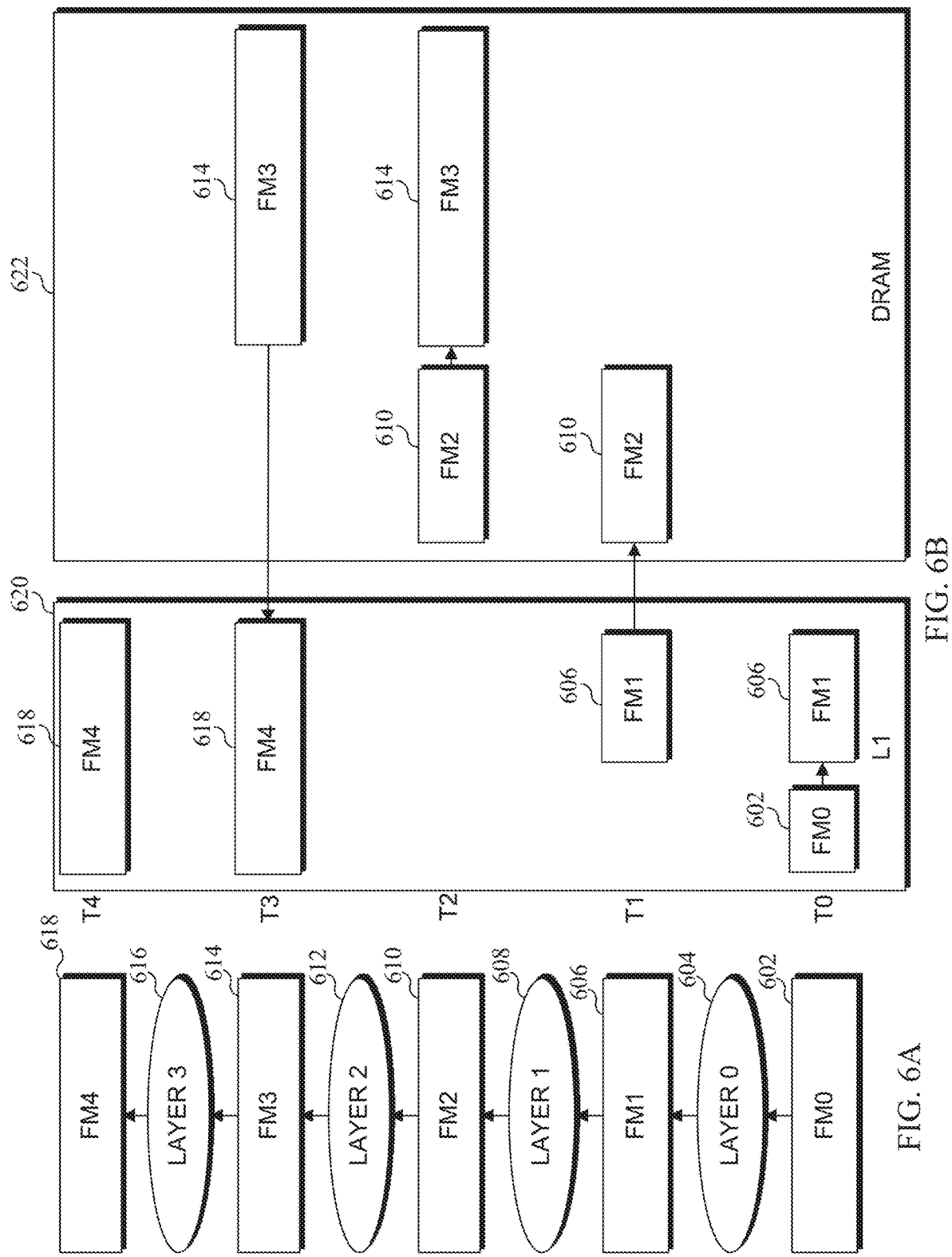
FIG. 6A illustrates an example neural network topology in accordance with embodiments of the present disclosure.
FIG. 6B illustrates a block diagram of an example dynamic memory mapping process for a neural network in accordance with embodiments of the present disclosure.

FIG. 5 illustrates a flowchart of a neural network optimization framework in accordance with embodiments of this disclosure. At a block 502, a neural network is configured. This network configuration takes into account the problem(s) to be solved by the neural network, the types of data for processing by the neural network, and other factors to configure the neural network to address those issues, such as determining how many layers, that is, how deep, the neural network may be. The neural network is then trained at block 504 and the accuracy of the neural network is ascertained at block 506. Based on the results of the training and the ascertained accuracy of the neural network, the configuration of the network can be adjusted at block 508 to increase the accuracy of the neural network. The adjustment performed in block 508 can be adjustments, such as altering the number of layers of the neural network, adjusting weights of the neural network, or other adjustments; and the network is thus reconfigured at block 502. Blocks 502, 504, 506, and 508 can be repeated until the accuracy of the neural network meets the application's requirements.

Typically, other neural network configuration processes can perform training, accuracy, and configuration adjustment steps and then simplify the neural network until speed and power consumption requirements are met for target hardware. However, this does not take into account the characteristics of the target hardware when designing a neural network. At block 510, the target hardware configuration is determined and at step 512, computations are optimized and memory mapping implemented for the target hardware. The optimized computations can be achieved by layer fusion according to embodiments of the present disclosure, and dynamic memory mapping also can be implemented according to embodiments of the present disclosure, to optimally map neural network data such as feature maps onto a given memory system. At block 514, latency, speed, power, and memory usage can be evaluated. The forward pass performance metrics for the hardware target also can be evaluated. At block 508, the network configuration adjustment policy takes into account not only training and accuracy of the neural network, but hardware parameters as well. The network configuration thus can be adjusted and the optimal calculations and memory mapping adjusted in order to provide a more accurate neural network that also achieves less latency, higher speeds, and lower power and memory usage.

FIG. 6A illustrates a neural network topology in accordance with embodiments of the present disclosure. The neural network topology includes a first feature map 602 (FM0), which can be initially stored in memory. The first feature map 602 can be a feature map of an input. The first feature map 602 is then received by a first layer 604 (layer 0). The first layer 604 processes the first feature map 602, such as performing convolutions on the first feature map 602. As a result, the first layer 604 creates a second feature map 606 (FM1) that is stored in memory. The neural network then passes the second feature map 606 to a second layer 608 (layer 1). The second layer 608 can perform various operations on the second feature map 606, such as additional convolutions, batch normalization operations, ReLU operations, pooling operations or other operations. As a result, the second layer 608 creates a third feature map 610 (FM2).

The neural network then passes the third feature map 610 to a third layer 612 (layer 2) that can perform various operations on the second feature map 606, such as additional convolutions, batch normalization operations, ReLU operations, pooling operations or other operations. As a result, the third layer 612 creates a fourth feature map 614 (FM3). The neural network then passes the fourth feature map 614 to a fourth layer 616 (layer 3) that can perform various operations on the second feature map 606, such as additional convolutions, batch normalization operations, ReLU operations, pooling operations or other operations. As a result, the fourth layer 616 creates a fifth feature map 618 (FM4). The fifth feature map 618 can be used in subsequent layers of the neural network, or can be one of a series of final weights or inputs to be used by the neural network in a fully connected layer for providing the final output.

It will be understood that the topology illustrated and described with respect to FIG. 6A is not limited to any particular neural network type or configuration. Other types of neural networks, such as networks used for voice recognition that receive a vector of input values, are applicable to the topology of FIG. 6A and are applicable to the other processes described herein.

The feature maps or other data such as input vectors and the results of inputs applied to weights and sent through an activation function can all be stored in memory for use by the neural network during operation of the neural network. Neural networks often map data such as feature maps in a static manner in DRAM, such that a memory location continues to store this data during operation of the neural network while potentially adding even more data to DRAM during operation of the neural network. The memory usage for a static mapped neural network thus grows proportionally with the depth of the network. Additionally, for each layer, a static mapped neural network has to read input data to on-chip memory and write out output data to DRAM.

FIG. 6B illustrates a block diagram of an example dynamic memory mapping process for a neural network in accordance with embodiments of the present disclosure. In the example, an L1 cache 620 and DRAM 622 are depicted. The L1 cache 620 and the DRAM 622 can be connected to a processor such as that described with respect to the server 200 or the electronic device 300. In this example, at a time T0 the first feature map 602 is mapped to the L1 cache 620 by the processor. The first feature map 602 is ready to be fed through the first layer 604 to create the second feature map 606. The L1 cache 620 has enough space for both the first feature map 602 and the second feature map 606, and so the processor prioritizes mapping the second feature map 606 to the L1 cache 620. Prioritizing both the first feature map 602 and the second feature map 606 allows layer 604 to process the first feature map 602 and the second feature map 606 directly without extra data movement between the L1 cache 620 and the DRAM 622. At time T1, the second feature map 606 is ready to be processed by the second layer 608. Also, by time T1, the first feature map 602 is no longer used and so the first feature map 602 expires. The processor thus removes the first feature map 602 from the L1 cache 620 and unallocates memory in the L1 cache 620.

At time T1, the processor determines that the second feature map 606 and the third feature map 610 will not both fit into the L1 cache 620. Therefore, the processor maps the third feature map 610 to DRAM 622. At a time T2, the second feature map 606 has been processed by the second layer 608 and the third feature map 610 has been created and stored in DRAM 622. Thus, by T2, the second feature map 606 expires and the processor removes the second feature map 606 from the L1 cache 620. At T2, the L1 cache 620 is now free to store additional feature maps, if the additional feature maps fit into the L1 cache 620. At T2, the processor determines that the fourth feature map 614 will not fit into the L1 cache 620. Therefore, the processor maps the fourth feature map 614 to DRAM 622. By time T3, the processor removes the third feature map 610 from DRAM 622 as the third feature map 610 has already been processed by the third layer 612 and the processor has stored the fourth feature map 614 in DRAM 622 in the mapped DRAM location.

At time T3, the processor determines that the fifth feature map 618 will fit into the L1 cache 620, and the processor maps the fifth feature map 618 to the L1 cache 620. At time T3, the fourth feature map 614 is still stored in DRAM 622. By time T4, the processor stores the fifth feature map 618 in the L1 cache 620, and the processor removes the fourth feature map 614 from DRAM 622, to free up memory space in DRAM 622 and to allow potential subsequent feature maps to be stored in DRAM 622 in the space previously occupied by the fourth feature map 614. The process described with respect to FIG. 6B thus allows for memory to be freed for use during operation of a neural network, while also allowing for data to be stored in memory other than DRAM that provides faster data access to the processor(s). As illustrated in FIG. 6B, the first feature map 602, the second feature map 606, and the fifth feature map 618 can potentially have overlapping memory mappings in the L1 cache 620 because the life spans of these feature maps in the time axis do not overlap.

Once optimal mapping of the neural network is determined, network performance metrics can be estimated, such as forward pass speed, latency, memory usage, and power consumption, given the target hardware. In the network training process, accuracy metrics can also be obtained, which can be combined with the network performance metrics to form a comprehensive performance metric. If all the metrics meet the requirements of the target application, the optimization may be complete. Otherwise, the metrics can be provided to the network configuration adjustment policy 508 to determine further network configuration. The network configuration adjustment policy 508 takes into account both the network topology and the target hardware memory hierarchy. The adjustment policy can be prioritized to simplify the layers of the neural network that are identified as performance bottlenecks in the network according to estimated network performance. The adjustment policy 508 can (1) try to reduce the output channels for the bottleneck layers so that the output can fit into the on-chip memory and the speed, latency, and power requirements of the target application are met. The adjusted network can then (2) be retrained to output the accuracy metric. If the accuracy requirement is met, the network configuration adjustment is finished. Otherwise, the adjustment policy can in some embodiments add an additional layer to the neural network following the bottleneck layer and repeat steps (1) and (2) until performance requirements are met.

Figure 7:
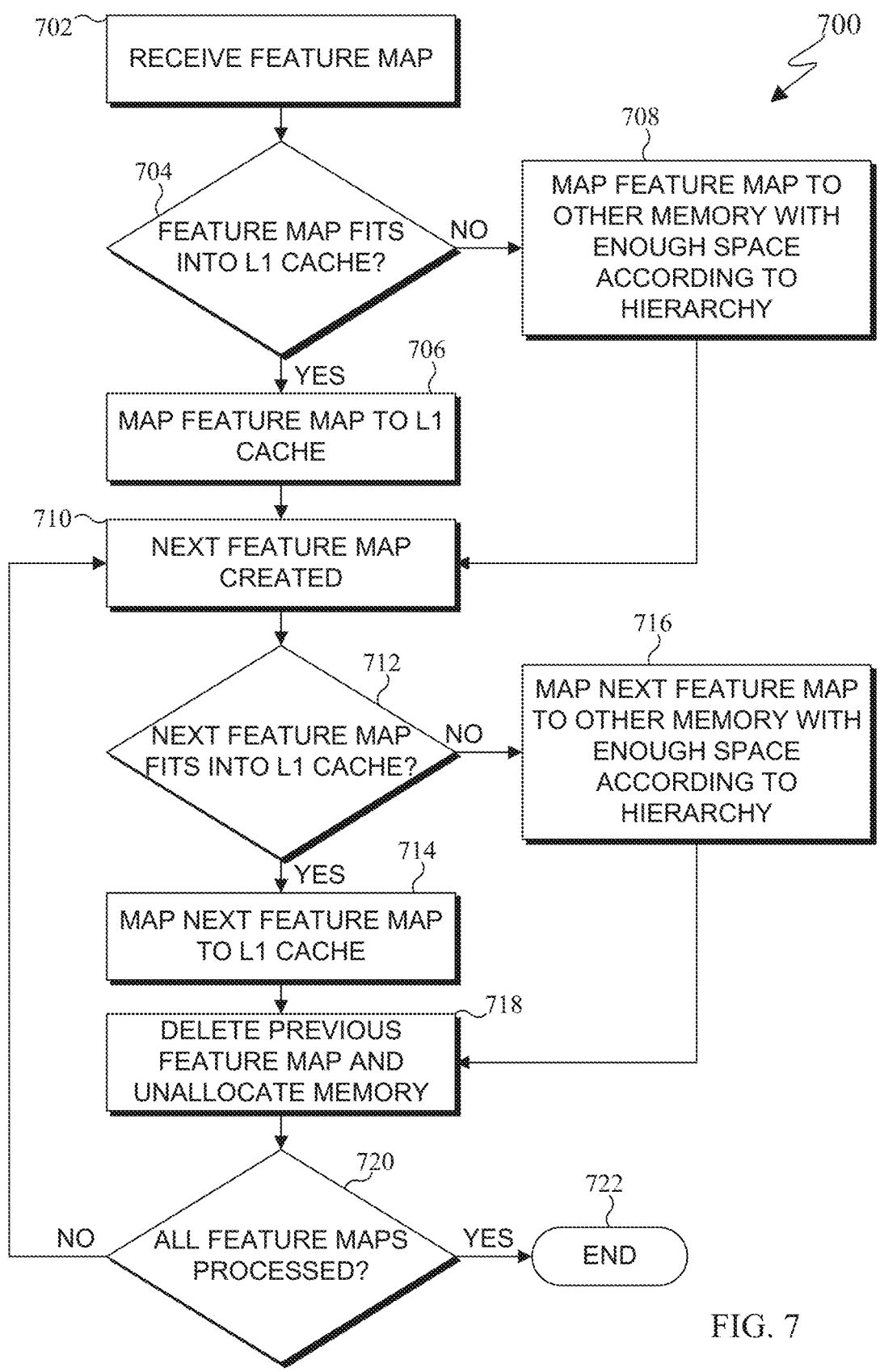
FIG. 7 illustrates a flowchart of a dynamic memory mapping process in accordance with embodiments of the present disclosure.

FIG. 7 illustrates a flowchart of a dynamic memory mapping process 700 in accordance with embodiments of the present disclosure. FIG. 7 does not limit the scope of this disclosure to any particular embodiments. While process 700 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 700 is described with respect to the server 200 of FIG. 2 and the electronic device 300 of FIG. 3 and is performed by a respective processor or processing device in the server 200 or electronic device 300. However, the process 700 can be used with any other suitable system.

The process 700 begins at block 702 where a feature map or other data is received for use in a neural network. At decision block 704, the processor determines whether the feature map fits into an L1 cache. If so, at block 706 the processor maps the feature map to the L1 cache. If not, at block 708, the processor maps the feature map to another memory, such as another processor cache (L2, L3, L4, and so forth), DRAM, or other memory according to the memory hierarchy. The feature map is thus mapped and stored in whichever memory provides the fastest access time for the processor and that has enough space to store the feature map.

Once the feature map is stored in either the L1 cache at block 704 or the next fastest available memory at block 708, the processor, using a neural network application, creates a next feature map at block 710. At decision block 712 the processor determines if the L1 cache can store the next feature map. If so, at block 714, the processor maps the next feature map to the L1 cache. If not, at block 716, the processor maps the next feature map to another memory, such as another processor cache (L2, L3, L4, etc.), DRAM, or other memory according to the memory hierarchy. Once the next feature map is stored in either the L1 cache at block 714 or the next fastest available memory at block 716, at block 718 the processor deletes the feature map received at block 702 from the memory which was chosen for storing the feature map at decision block 704 and the processor unallocates memory for that feature map. Thus, the feature map received at block 702 is no longer stored in memory and memory is freed for storing other data or other feature maps.

In block 720, the processor determines whether all feature maps and other data have been processed by the neural network. This can be determined by whether the neural network has provided a final output(s). If so, the process 700 ends at block 722. If the neural network has not completed processing, the process moves back to block 710 where a next feature map is created or received. The process continues through decision block 712, and either blocks 714 or 716 to store the next feature map, to block 718 where the processor deletes the feature map created when block 710 was last encountered to free the memory to which the previous feature map was mapped. The process 700 then returns to decision block 720 where the processor determines again if processing is complete, and, if so, the process 700 ends at block 722.

Figure 8:
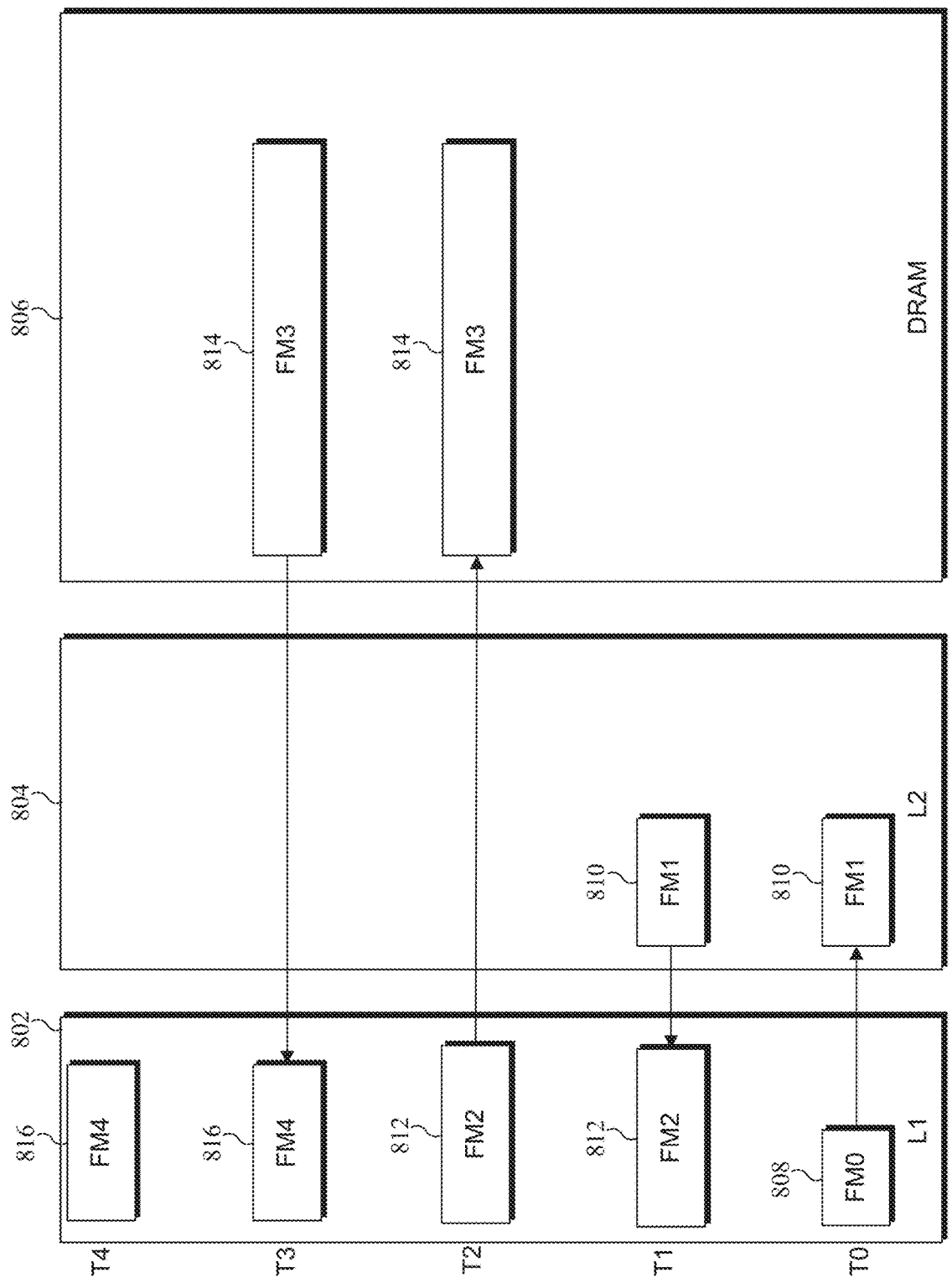
FIG. 8 illustrates a block diagram of another example dynamic memory mapping process for a neural network in accordance with embodiments of the present disclosure.

FIG. 8 illustrates a block diagram of another example dynamic memory mapping process for a neural network in accordance with embodiments of the present disclosure. There is shown an L1 cache 802, an L2 cache 804, and DRAM 806. The L1 cache 802, the L2 cache 804, and the DRAM 806 can be connected to a processor such as that described with respect to the server 200 or the electronic device 300. In this example, at a time T0 the processor maps a first feature map 808 (FM0) to the L1 cache 802. The first feature map 808 is to be fed through a first layer of a neural network to create a second feature map 810 (FM1). The L1 cache 802 in this example does not have enough space for both the first feature map 808 and the second feature map 810, and so the processor prioritizes mapping the second feature map 810 to the next memory that is closest to the processor. In this example, the L2 cache 804 has enough unallocated memory to store the second feature map 810, and so the processor maps the second feature map 810 to the L2 cache 804. It should be noted in this example that while DRAM 806 also had enough free space to store the second feature map 810, the L2 cache 804 is prioritized over DRAM 806 because the L2 cache 804 is higher in the memory hierarchy and provides quicker data access to the processor.

At time T1, the second feature map 810 is to be processed by a second layer of the neural network in order to create a third feature map 812. Also, by time T1, the first feature map 808 is no longer used and so the processor removes the first feature map 808 from the L1 cache 802 and the processor unallocates memory in the L1 cache 802. At time T1, after a memory to which the first feature map 808 was mapped is unallocated, the processor determines that the third feature map 812 can fit into the L1 cache 802. Since the L1 cache is higher in the hierarchy than the L2 cache 804 or the DRAM 806, the processor maps the third feature map 812 to the L1 cache 802.

At a time T2, the second feature map 810 has been processed by the second layer of the neural network and the processor stores the third feature map 812 in the L1 cache 802. Thus, by T2, the second feature map 810 is no longer to be used by the neural network and so the processor removes the second feature map 810 from the L2 cache 804. At T2, the processor determines that a fourth feature map 814 will not fit into the L1 cache 802 or the L2 cache 804. Therefore, the processor maps the fourth feature map 814 to DRAM 622.

By time T3, the processor removes the third feature map 812 from the L1 cache 802 as the third feature map 812 has already been processed by a third layer of the neural network and the processor stores the fourth feature map 814 in DRAM 806 in the mapped DRAM location. At time T3, the processor determines that a fifth feature map 816 will fit into the L1 cache 802, and the processor maps the fifth feature map 816 to the L1 cache 802. At time T3, the fourth feature map 814 is still stored in DRAM 806. By time T4, the processor stores the fifth feature map 816 in the L1 cache 802, and the processor removes the fourth feature map 814 from DRAM 806, to free up memory space in DRAM 806 and to allow potential subsequent feature maps to be stored in DRAM 806 in the space previously occupied by the fourth feature map 814. The process described with respect to FIG. 6B thus allows for memory to be freed for use during operation of a neural network, while also allowing for data to be stored in a memory that provides faster data access to a processor(s).

The processes described with respect to FIGS. 6A-8 provide dynamic memory mapping processes that map neural networks of arbitrary topologies onto a target hardware memory hierarchy to minimize the memory usage at all levels and minimize the data movement at all levels. Since each feature map has a limited life span on the time axis based on the network topology, the mapped memory can be reclaimed when it is no longer used. Memory usage is only limited by the maximum memory to accommodate one layer's input/output feature maps. Thus, deeper networks do not necessarily use more memory when using the dynamic memory mapping described herein.

The memory hierarchy can include a prioritization scheme such as L1-L2-L3-DRAM. It will be understood that the memory hierarchy can depend on the target hardware. The memory hierarchy can reduce both the time and the power consumption used to move feature maps or other data between on-chip and off-chip memory.

Figure 9:
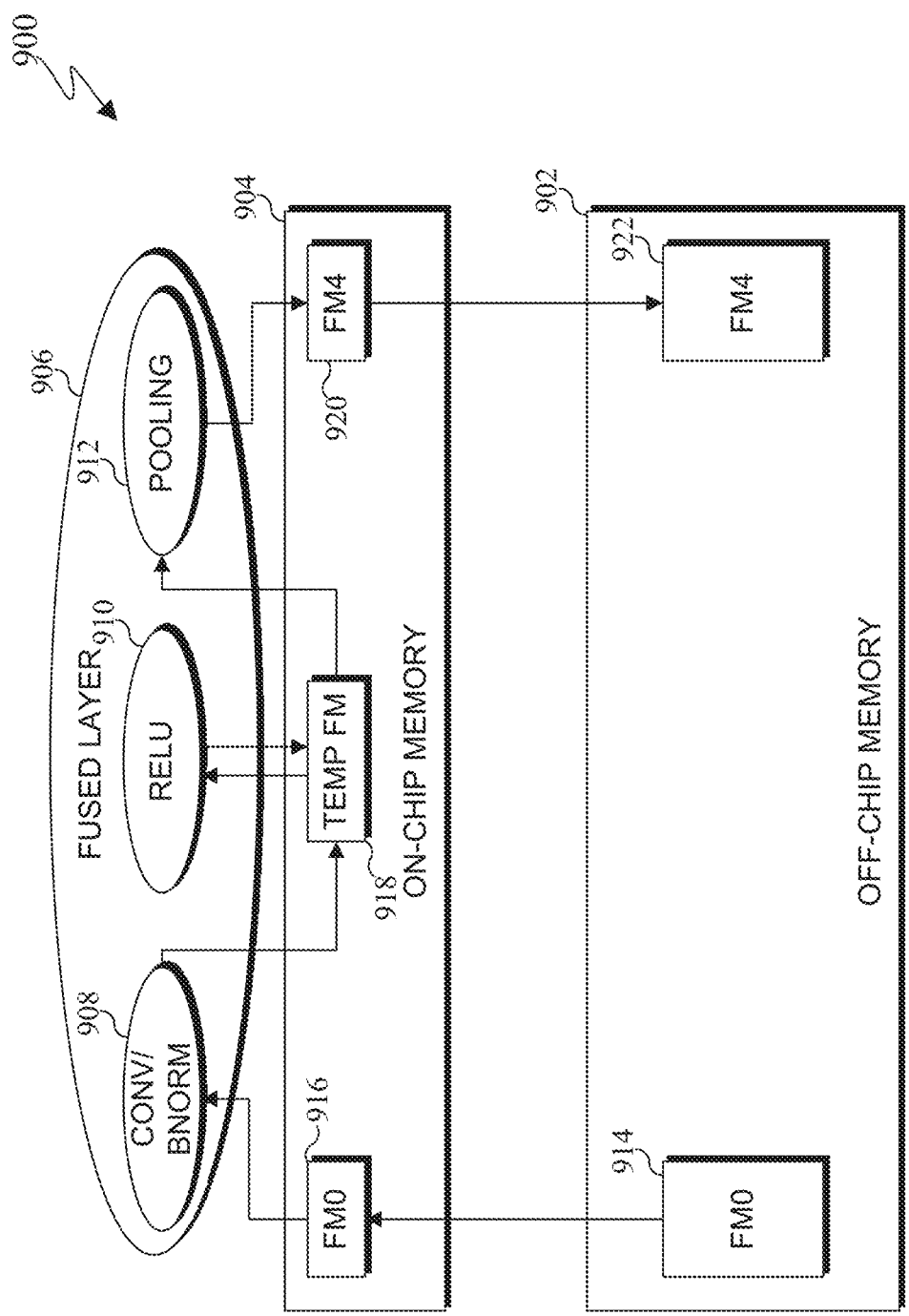
FIG. 9 illustrates a block diagram of one embodiment of a neural network layer fusion process in accordance with embodiments of the present disclosure.

FIG. 9 illustrates a block diagram of one embodiment of a neural network layer fusion process 900 in accordance with embodiments of the present disclosure. FIG. 9 shows off-chip memory 902 and on-chip memory 904. The off-chip memory 902 can be DRAM or other memory located off the processor die such as some forms of L3 or L4 cache memory, or other memory types. The off-chip memory 902 can be connected to a processor such as that described with respect to the server 200 or the electronic device 300. The on-chip memory 904 can be memory such as an L1 cache or other memory located on the processor die, such as on the processor of the processor described with respect to the server 200 or the electronic device 300.

A neural network including a fused layer 906 and running on the processor associated with the on-chip memory 904 receives data from the on-chip memory 904 during operation of the neural network. The fused layer 906 includes operations 908, 910, and 912. The operations 908, 910, and 912 can perform operations typically performed by separate layers, but are combined into one atomic fused layer 906. Fusing the layers into an atomic layer minimizes computations, data movement, memory usage, and power consumption associated with data movement and computations. In the example illustrated in FIG. 9, the operations include a convolution/bnorm operation 908, a rectified linear units (ReLU) operation 910, and a pooling operation 912. An input feature map 914 (FM0) can be initially stored in the off-chip memory 902. The processor can read at least one portion or tile 916 (FM0) of the input feature map 914 from off-chip memory 902 and write the at least one tile 916 to on-chip memory 904 for processing by the neural network. In some neural networks, a feature map FM0 can be convolved in a convolution layer to generate another feature map FM1.

The feature map FM1 can then be normalized by a batch normalization layer to produce yet another feature map FM2. The convolution/bnorm operation 908 merges convolution with batch normalization. For example, FM1 can be generated by Equation 1.

$$FM1 = \text{conv}(FM0, K) + b \tag{1}$$

After FM1 is created, FM2 can be generated by Equation 2.

$$FM2 = \text{gamma}(FM1 - \text{mean})/\text{var} + \text{beta} \tag{2}$$

Since Equation 1 and Equation 2 are linear equations, the bnorm layer parameters gamma, mean, var, and beta of Equation 2 can be absorbed into K and b and FM2 can be generated from one equation: Equation 3.

$$FM2 = \text{conv}(FM0, K') + b' \quad (3)$$

Therefore, FM0 can be convolved and batch normalized within one step by the convolution/bnorm operation 908. The convolution/bnorm operation 908 creates a temporary feature map 918 that has been convolved and batch normalized from the at least one tile 916, and the temporary feature map 918 is written to on-chip memory 904. It will be understood that merging convolution and bnorm steps into the convolution/bnorm operation 908 can be performed when configuring the neural network so that the merging is not performed during operation of the neural network so that there is no impact on the network's online inference performance.

In other neural network configurations, data granularity is managed by the cache system. In certain embodiments of the present disclosure, the fused layer 906 manages data granularity of the data to be processed by the neural network. The fused layer 906 can determine how to divide the input feature map 914 into the at least one tile 916 to be processed by the fused layer 906. As shown in FIG. 9, the at least one tile 916 will remain in on-chip memory 904 throughout the process until a final output is written to off-chip memory 902. The convolution tile size to be used can be based on pooling and convolution kernel sizes. For example, if the convolution kernel has size K*K and pooling kernel has size P*P, the convolution tile size is chosen by Equation 4.

$$T = (P + K - 1) \quad (4)$$

If the input feature map 914 has a dimension of [H,W,C] (height, width, color), then the feature map can be decomposed into [H/(P+K−1)]*[W/(P+K−1)] tiles. Once the tile size and number of tiles is determined, the number of tiles fetched from and written to on-chip memory 904 to be used by the fused layer 906 can be determined based on the size of the on-chip memory 904. For example, if K=3 and P=2, then T=(2+3−1), and so T=4. Thus, the tiles for convolving will be a size of 4*4. Convolving the 4*4 tiles with the 3*3 convolution kernels produces a temporary feature map 918 having a size of 2*2. After the ReLU operation 910, the pooling operation 912 can be applied to the 2*2 temporary feature map 918 to produce a final output of size 1. In some embodiments, the Winograd algorithm is applied to further accelerate small kernel/tile convolutions to reduce the multiply-accumulate (MAC) operation to further increase the speed of the neural network. In the above example, the Winograd algorithm can reduce the convolution MAC from 36 to 16, for a 2.25× reduction.

The ReLU operation 910 applies the temporary feature map 918 to an activation function and then can write the result back to on-chip memory 904 again as another temporary feature map 918. In some embodiments, the temporary feature map 918 before the ReLU operation 910 can be overwritten by the result of the ReLU operation 910. In some embodiments, the activation function of f(x)=max(0,x) can be used. It will be understood that other activation functions such as a leaky ReLU function, a parametric ReLU function, an exponential linear unit function (ELU), a sigmoid function, or others can be used in the ReLU operation 910.

The temporary feature map 918 can then be passed to the pooling operation 912. The pooling operation 912 performs a form of pooling on the temporary feature map 918, such as max pooling, to create a smaller sized feature map tile 920 (FM4). The tile 920 is then written to off-chip memory 902 as an output or final feature map 922. In some embodiments, the fused layer 906 is configured such that the pooling operation 912 outputs just one output for each temporary feature map 918 received by the pooling operation 912, such that the tile 920 is one output to be used in determining the final result of the neural network. The final feature map 922 in this example can be a series of values, each value one of the tiles 920 written to off-chip memory 902. These values can then be used, for example, as votes for whether an image includes an object that the neural network is designed to recognize.

In other neural networks, separate layers such as convolutional, pooling, ReLU, and batchnorm layers are treated as atomic operations, writing an output feature map from on-chip memory to off-chip memory after each layer. For example, in other neural networks, an input layer FM0 can be stored in off-chip memory. Tiles from FM0 are written to on-chip memory and processed by a convolutional layer to create tiles of an intermediate feature map FM1. The tiles of feature map FM1 are written from on-chip memory to off-chip memory. Tiles from feature map FM1 are then written back to on-chip memory to be processed by a bnorm layer, for example, creating tiles for another intermediate feature map FM2. The tiles of feature map FM2 are all written from on-chip memory to off-chip memory again until all of feature map FM2 is on off-chip memory. The tiles of FM2 are then written from off-chip memory back into on-chip memory to be processed by, for example, a ReLU layer to create another intermediate feature map FM3.

The tiles of intermediate feature map FM3 are all written back to off-chip memory as feature map FM3. Then the tiles of feature map FM3 are written back into on-chip memory again to be processed by, for example, a pooling layer to create final outputs or tiles that can be a final feature map FM4. Each of these tiles is written from on-chip memory to off-chip memory until FM4 is completely stored in off-chip memory. Typically, all the feature maps FM0-FM4 are too large to fit into SRAM. Because of this, memory is allocated for the three intermediate feature maps FM1, FM2, and FM3, and extra data movement between on-chip and off-chip memory is performed. Other neural networks thus perform a larger number of read/write operations between on-chip and off-chip memory (reducing speed) than neural networks of the present disclosure. Other neural networks also use more memory resources to perform the functions of the neural network, such as requiring memory to store the intermediate feature maps.

The neural network of the present disclosure provides for increased speed and more efficient use of resources. Additionally, there is less data traffic between on-chip and off-chip memory. In such an optimized network, only the input feature map and the output feature map are stored in DRAM, with all temporary/intermediate feature maps remaining in on-chip memory during operation of the fused layer.

Figure 10:
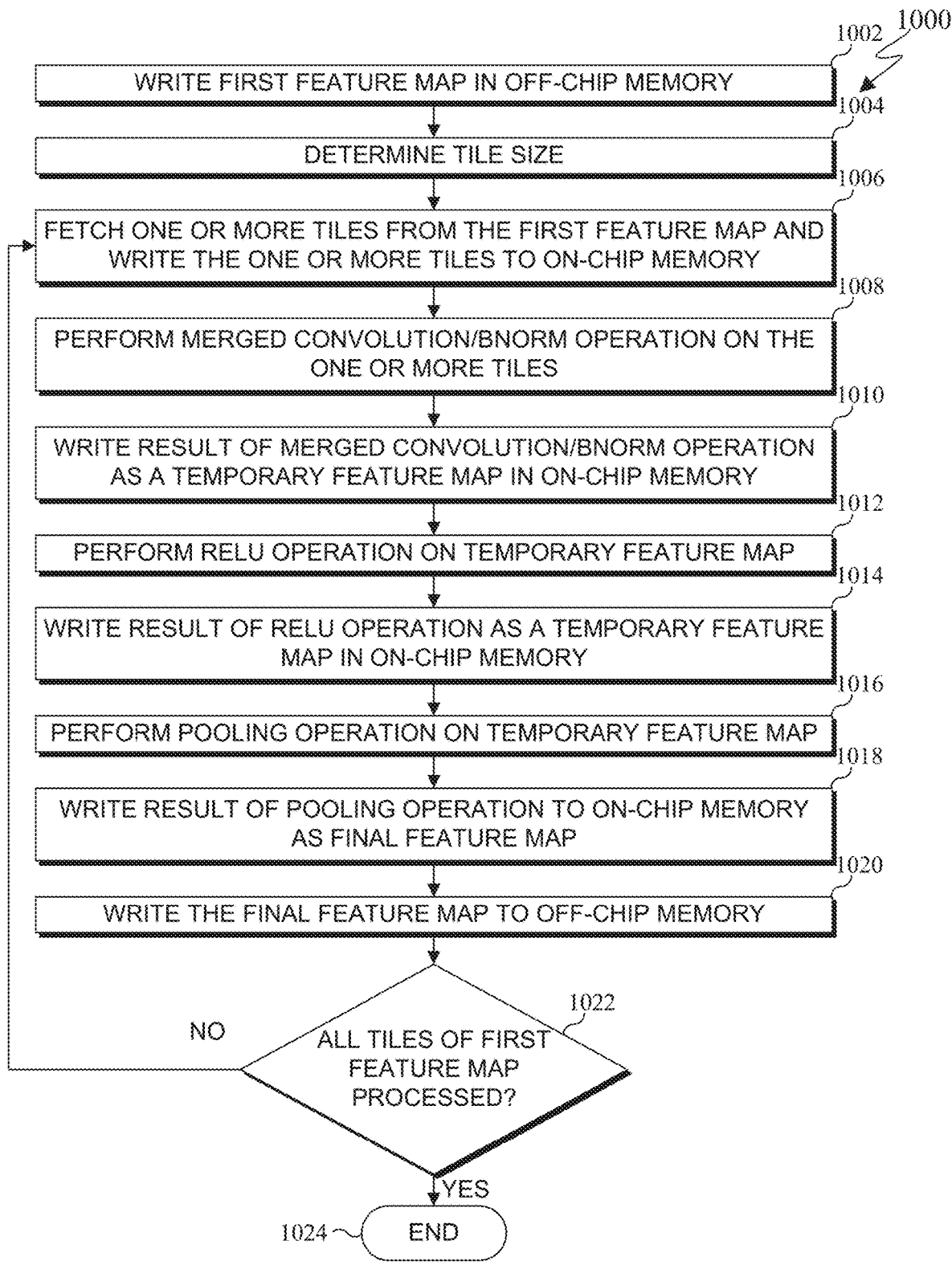
FIG. 10 illustrates a flowchart of a fused layer neural network process in accordance with embodiments of the present disclosure.

FIG. 10 illustrates a flowchart of a fused layer neural network process 1000 in accordance with embodiments of the present disclosure. FIG. 10 does not limit the scope of this disclosure to any particular embodiments. While process 1000 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1000 is described with respect to the server 200 of FIG. 2 and the electronic device 300 of FIG. 3 and is performed by a respective processor or processing device in the server 200 or electronic device 300. However, the process 1000 can be used with any other suitable system.

The process 1000 begins at block 1002. At block 1002, the processor writes a first feature map or input feature map to off-chip memory. At block 1004 the processor determines a tile size. The tile size can be determined as described in the present disclosure and as described with respect to FIG. 11. At block 1006, the processor fetches one or more tiles from the first feature map and the processor writes the one or more tiles to on-chip memory. The number of tiles to be fetched depends on the size of the on-chip memory. Space in on-chip memory will also need to be reserved for temporary feature maps and the final outputs. At block 1008, the processor feeds the one or more tiles written to on-chip memory in block 1006 into the fused layer and the processor performs a merged convolution/bnorm operation on the one or more tiles as described in the present disclosure. At block 1010, the processor writes the result of the convolution/bnorm operation to on-chip memory as a temporary feature map. It will be understood that the convolution/bnorm operation can be performed on one of the one or more tiles at a time.

At block 1012, the processor performs a ReLU operation of the fused layer on the temporary feature map. At block 1014, the processor writes the result of the ReLU operation to on-chip memory as a temporary feature map. The temporary feature map written to on-chip memory as a result of the ReLU operation can overwrite the temporary feature map created as a result of the convolution/bnorm operation. At block 1016, the processor performs a pooling operation of the fused layer on the temporary feature map written to on-chip memory in block 1014. At block 1018, the processor writes the result of the pooling operation to on-chip memory. The result can be one or more tiles of a final feature map, and can be the final outputs provided by neural network, such as one or more values indicating whether an object is recognized as appearing in an image.

At block 1020, the processor writes the final feature map to off-chip memory. It will be understood that each tile of the input feature map can be processed by the fused layer at a time, and each output created from that tile as a result of the pooling operation can be written by the processor to off-chip memory one at a time until all tiles from the input feature map have been processed by the fused layer and all outputs written to off-chip memory as the final feature map. At decision block 1022, the processor determines whether all tiles of the first feature map have been processed by the neural network. If not, the process 1000 moves back to block 1006 to fetch one or more additional tiles from the first feature map, depending on how much free space exists in on-chip memory. Blocks 1006-1022 can be repeated until at decision block 1022 the processor determines that all tiles of the first feature map have been processed. If so, the process 1000 ends at block 1024.

Figure 11:
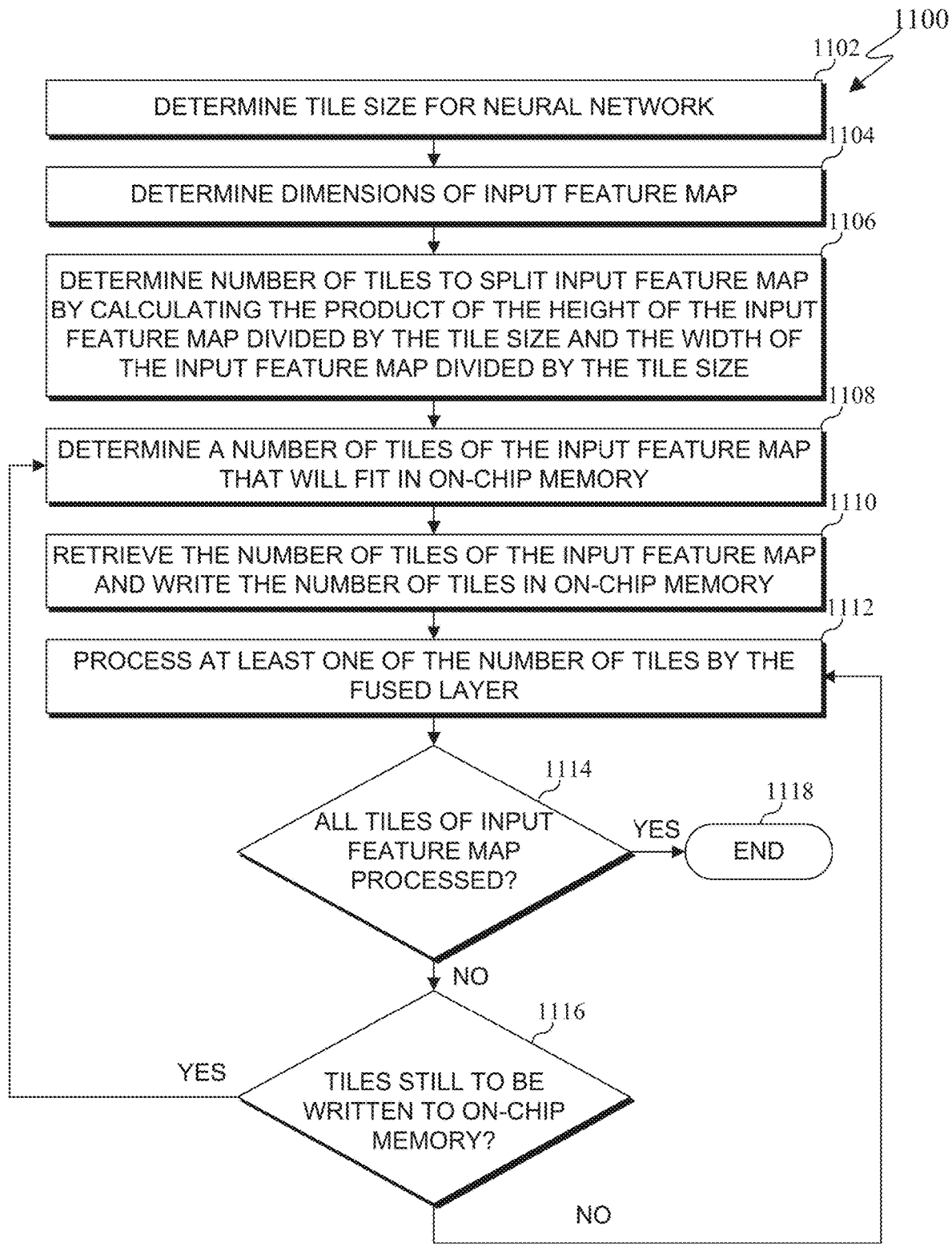
FIG. 11 illustrates a flowchart of a feature map tiling and memory allocation process in accordance with embodiments of the present disclosure.

FIG. 11 illustrates a flowchart of a feature map tiling and memory allocation process 1100 in accordance with embodiments of the present disclosure. FIG. 11 does not limit the scope of this disclosure to any particular embodiments. While process 1100 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1100 is described with respect to the server 200 of FIG. 2 and the electronic device 300 of FIG. 3 and is performed by a respective processor or processing device in the server 200 or electronic device 300. However, the process 1100 can be used with any other suitable system.

The process 1100 begins at block 1102. At block 1102, the processor determines a tile size to be used in the neural network. This can be performed when initially configuring the neural network, and can be adjusted as the neural network is trained and hardware considerations are taken into account. The pooling kernel size and convolution kernel size to be used can also be determined during neural network configuration. The tile size can be determined by Equation 1, $T=(P+K-1)$.

An input feature map can be provided as an input for the neural network. At block 1104, the processor determines the dimensions of the input feature map. For example, the input feature map can be an image having 32*32 pixels. At block 1106, the processor determines the number of tiles to split the feature map into. The processor can perform this determination by calculating the product of the height of the feature map divided by the tile size and the width of the feature map divided by the tile size, or $[H/(P+K-1)]*[(W/(P+K-1)]$, or $(H/T)*(W/T)$. Using the example of a 32*32 input image, and where T=4, the image would be split into 64 tiles. At block 1108, the processor determines the number of tiles that will fit in on-chip memory. The processor can analyze the amount of free space in the on-chip memory and the size of each tile to determine how many tiles can be written to on-chip memory, taking into account space requirements for the intermediate feature maps and final outputs that will be created from each of the tiles.

At block 1110, processor retrieves the number of tiles determined to fit in on-chip memory and writes the tiles to on-chip memory. At block 1112, at least one of the tiles written to on-chip memory is processed by the fused layer of the neural network, producing an output that can be written to off-chip memory by the processor, freeing space in on-chip memory that the at least one tile previously occupied. At decision block 1114, the processor determines whether all tiles of the input feature map have been processed by the fused layer. If not, the process 1100 moves to decision block 1116 where the processor determines if there are still tiles of the input feature map in off-chip memory that need to be written to on-chip memory for processing by the fused layer. If so, the process 1100 moves back to block 1108 where the processor determines a number of tiles of the input feature map that will fit into on-chip memory. If for some reason there is not enough free space for additional tiles to be written to on-chip memory, the processor can determine a value of zero and no additional tiles may be retrieved at block 1110, allowing for another tile to finish processing by the fused layer at block 1112. This can free up the space used for additional tiles when block 1108 is repeated after the processor determines at decision block 1116 that there are still tiles in off-chip memory to be processed. Blocks 1108, 1110, 1112, 1114, and 1116 can be repeated until all tiles are written from off-chip memory into on-chip memory.

If at decision block 1116 the processor determines that there are no more tiles in off-chip memory to be processed, the process 1100 moves back to block 1112 to process another at least one tile by the fused layer. Blocks 1112, 1114, and 1116 can be repeated until all tiles in on-chip memory are processed by the fused layer. Once the processor determines at decision block 1114 that all tiles of the input feature map have been processed by the fused layer, the process 1100 ends at block 1118.

Layer fusion can increase the speed of the neural network. For example, a processing time for a neural network without layer fusion can be 91.8 milliseconds. Applying layer fusion for a network on the same hardware can provide a processing time of 68.8 milliseconds. As a neural network becomes deeper or more complicated, layer fusion can provide even greater improvement in processing time.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
mapping a plurality of feature maps of a neural network onto a memory hierarchy, including:
  mapping a first feature map of the plurality of feature maps to a memory in the memory hierarchy having available memory space and providing quickest access to the first feature map;
  generating a second feature map of the plurality of feature maps from the first feature map;
  removing, in response to a mapping of the second feature map, the first feature map from the memory; and
  unallocating the memory used to store the first feature map;
determining, based on the mapping of the plurality of feature maps, that one or more layers of the neural network output a feature map that could not be mapped to an on-chip memory in the memory hierarchy; and
reducing, based on the determination, output channels for at least one of the one or more layers of the neural network.

2. The method of claim 1, wherein mapping the plurality of feature maps onto the memory hierarchy further includes:
determining that the memory is higher in the memory hierarchy than another memory in the memory hierarchy;
determining that the second feature map can be mapped to the memory based on unallocated space in the memory; and
mapping the second feature map to the memory.

3. The method of claim 1, wherein mapping the plurality of feature maps onto the memory hierarchy further includes:
determining that the memory is higher in the memory hierarchy than another memory in the memory hierarchy;
determining that the second feature map cannot be mapped to the memory based on allocated space in the memory; and
mapping the second feature map to the other memory.

4. The method of claim 1, wherein generating the second feature map from the first feature map includes:
providing the first feature map to a specified layer of the neural network; and
performing a layer operation of the neural network on the first feature map.

5. The method of claim 1, wherein the memory hierarchy includes at least one level of cache memory and dynamic random-access memory (DRAM).

6. An electronic device comprising:
at least one memory in a memory hierarchy; and
at least one processor coupled to the at least one memory, the at least one processor configured to:
map a plurality of feature maps of a neural network onto the memory hierarchy, wherein, to map the plurality of feature maps onto the memory hierarchy, the at least one processor is configured to:
  map a first feature map of the plurality of feature maps to a memory in the memory hierarchy having available memory space and providing quickest access to the first feature map;
  generate a second feature map of the plurality of feature maps from the first feature map;
  remove, in response to a mapping of the second feature map, the first feature map from the memory; and
  unallocate the memory used to store the first feature map;
determine, based on the mapping of the plurality of feature maps, that one or more layers of the neural network output a feature map that could not be mapped to an on-chip memory in the memory hierarchy; and
reduce, based on the determination, output channels for at least one of the one or more layers of the neural network.

7. The electronic device of claim 6, wherein the at least one processor is further configured to:
determine that the memory is higher in the memory hierarchy than another memory in the memory hierarchy;
determine that the second feature map can be mapped to the memory based on unallocated space in the memory; and
map the second feature map to the memory.

8. The electronic device of claim 6, wherein the at least one processor is further configured to:
determine that the memory is higher in the memory hierarchy than another memory in the memory hierarchy;
determine that the second feature map cannot be mapped to the memory based on allocated space in the memory; and
map the second feature map to the other memory.

9. The electronic device of claim 6, wherein the at least one processor is further configured to:
provide the first feature map to a specified layer of the neural network; and
perform an operation of the specified layer of the neural network on the first feature map to generate the second feature map.

10. The electronic device of claim 6, wherein the memory hierarchy includes at least one level of cache memory and dynamic random-access memory (DRAM).

11. A non-transitory computer readable medium embodying a computer program, the computer program comprising computer readable program code that, when executed by at least one processor, causes the at least one processor to:
map a plurality of feature maps of a neural network onto a memory hierarchy, wherein the computer readable program code that causes the at least one processor to map the plurality of feature maps onto the memory hierarchy comprises computer readable program code that causes the at least one processor to:
  map a first feature map of the plurality of feature maps to a memory in the memory hierarchy having available memory space and providing quickest access to the first feature map;
  generate a second feature map of the plurality of feature maps from the first feature map;
  remove, in response to a mapping of the second feature map, the first feature map from the memory; and unallocate the memory used to store the first feature map;

determine, based on the mapping of the plurality of feature maps, that one or more layers of the neural network output a feature map that could not be mapped to an on-chip memory in the memory hierarchy; and reduce, based on the determination, output channels for at least one of the one or more layers of the neural network.

12. The non-transitory computer readable medium of claim 11, wherein the computer program further comprises computer readable program code that, when executed by the at least one processor, causes the at least one processor to:

determine that the memory is higher in the memory hierarchy than another memory in the memory hierarchy;

determine that the second feature map can be mapped to the memory based on unallocated space in the memory; and map the second feature map to the memory.

13. The non-transitory computer readable medium of claim 11, wherein the computer program further comprises computer readable program code that, when executed by the at least one processor, causes the at least one processor to:

determine that the memory is higher in the memory hierarchy than another memory in the memory hierarchy;

determine that the second feature map cannot be mapped to the memory based on allocated space in the memory; and map the second feature map to the other memory.

14. The non-transitory computer readable medium of claim 11, wherein the computer program further comprises computer readable program code that, when executed by the at least one processor, causes the at least one processor to:

provide the first feature map to a specified layer of the neural network; and perform an operation of the specified layer of the neural network on the first feature map to generate the second feature map.

15. The non-transitory computer readable medium of claim 11, wherein the memory hierarchy includes at least one level of cache memory and dynamic random-access memory (DRAM).

16. An electronic device comprising:

memory including on-chip memory and off-chip memory; and at least one processor coupled to the memory, the at least one processor configured to:

write data from a neural network input to the on-chip memory;

provide the data in the on-chip memory to a fused layer of a neural network, wherein the fused layer includes two or more layers that are combined into one atomic layer to reduce data movement between the on-chip memory and the off-chip memory, wherein the two or more layers combined into the fused layer include (i) a merged convolution and batch normalization layer and (ii) a pooling layer, wherein the merged convolution and batch normalization layer includes one or more batch normalization parameters of a batch normalization equation absorbed into a convolutional equation to create a merged convolution and batch normalization operation;

perform one or more fused layer operations on the data, the one or more fused layer operations including the merged convolution and batch normalization operation;

generate an output from the one or more fused layer operations; and write the output to the off-chip memory.

17. The electronic device of claim 16, wherein the data includes one or more tiles of a feature map.

18. The electronic device of claim 17, wherein the at least one processor is further configured to:

write a result of the merged convolution and batch normalization operation to the on-chip memory as a temporary feature map.

19. The electronic device of claim 17, wherein the at least one processor is further configured to:

determine a tile size of the one or more tiles based on a convolution kernel and a pooling kernel; and divide the feature map into the one or more tiles according to the tile size.

20. The electronic device of claim 19, wherein the at least one processor is further configured to:

write a result of the merged convolution and batch normalization operation to the on-chip memory as a temporary feature map.

21. The electronic device of claim 20, wherein the one or more fused layer operations further include a rectified linear units (ReLU) operation, and wherein the at least one processor is further configured to:

overwrite, in the on-chip memory, the temporary feature map with a result of the ReLU operation as another temporary feature map.

22. The electronic device of claim 21, wherein the one or more fused layer operations further include a pooling operation, and wherein the at least one processor is further configured to:

write a result of the pooling operation to the on-chip memory.

23. The electronic device of claim 22, wherein the result of the pooling operation is written to the on-chip memory before writing the output to the off-chip memory.

24. The electronic device of claim 17, wherein the off-chip memory does not store any data for the neural network except for the neural network input and the output.

25. The electronic device of claim 17, wherein the at least one processor is further configured to:

determine, before writing data from the neural network input to the on-chip memory, an amount of data to write to the on-chip memory based on an amount of unallocated memory in the on-chip memory and based on an amount of memory in the on-chip memory to be used by the one or more fused layer operations.

* * * * *